US011310653B1

(12) United States Patent
Moore et al.

(10) Patent No.: US 11,310,653 B1
(45) Date of Patent: Apr. 19, 2022

(54) VISITOR LOCATION REGISTER REGISTRATION HANDLING

(71) Applicant: HEWLETT PACKARD ENTERPRISE DEVELOPMENT LP, Houston, TX (US)

(72) Inventors: Tiffany A. Moore, Omaha, NE (US); Venkatesh G Bettadapura, Omaha, NE (US)

(73) Assignee: Hewlett Packard Enterprise Development LP, Houston, TX (US)

(*) Notice: Subject to any disclaimer, the term of this patent is extended or adjusted under 35 U.S.C. 154(b) by 9 days.

(21) Appl. No.: 17/071,096

(22) Filed: Oct. 15, 2020

(51) Int. Cl.
*H04W 8/06* (2009.01)
*H04W 60/00* (2009.01)
*H04W 8/12* (2009.01)
*H04W 8/04* (2009.01)

(52) U.S. Cl.
CPC .............. *H04W 8/06* (2013.01); *H04W 8/04* (2013.01); *H04W 8/12* (2013.01); *H04W 60/00* (2013.01)

(58) Field of Classification Search
CPC .......... H04W 8/06; H04W 8/04; H04W 8/12; H04W 60/00
USPC ................ 370/329, 328, 338, 341, 345, 350
See application file for complete search history.

(56) References Cited

U.S. PATENT DOCUMENTS

| 5,734,977 | A | 3/1998 | Sanmugam | |
| 8,213,900 | B2* | 7/2012 | Heutschi | H04L 63/0853 455/406 |
| 8,705,445 | B2* | 4/2014 | Watfa | H04W 36/0022 370/328 |
| 10,091,715 | B2 | 10/2018 | Goldfarb | |
| 10,470,154 | B2 | 11/2019 | Chellamani et al. | |
| 2011/0113068 | A1* | 5/2011 | Ouyang | H04L 67/306 707/784 |
| 2014/0348065 | A1* | 11/2014 | Lu | H04W 36/0022 370/328 |
| 2019/0327612 | A1 | 10/2019 | Bishop et al. | |

(Continued)

FOREIGN PATENT DOCUMENTS

CN 110945886 A 3/2020

OTHER PUBLICATIONS

ETSI, "TS 129 002: Mobile Application Part (MAP) specification," V10.2.0, Release 10, Apr. 2011, 955 pages.

(Continued)

*Primary Examiner* — Nghi H Ly
(74) *Attorney, Agent, or Firm* — Hewlett Packard Enterprise Patent Department

(57) ABSTRACT

Example implementations relate to registering a Visitor Location Register (VLR) at a Home Location Register (HLR). A request from a VLR may be received. The received request may be a request to update a location record of a subscriber associated with a subscriber profile at a database. A record of the database may be checked to determine whether the requesting VLR is a flagged VLR. Responsive to determining that the VLR is flagged, a cancelation of a currently registered VLR may be delayed. The delay may include maintaining the registration of the currently registered VLR while attempting to register the subscriber at the requesting VLR. Where the requesting VLR is successfully registered, the currently registered VLR may be canceled.

20 Claims, 7 Drawing Sheets

(56) References Cited

U.S. PATENT DOCUMENTS

2020/0007538 A1 1/2020 Mehta

OTHER PUBLICATIONS

ITecTec, "5.2.1 Mobile Terminating Roaming Retry Call after successful Retrieval of Routeing Information," available online at <https://itectec.com/spec/5-2-1-mobile-terminating-roaming-retry-call-after-successful-retrieval-of-routeing-information/>, retrieved on Oct. 26, 2020, 3 pages.

Positive Technologies, "SS7 Vulnerabilities and Attack Exposure Report," 2018, pp. 1-28.

Mazroa, A. et al., "Securing the User Equipment (UE) in LTE Networks by Detecting Fake Base Stations," International Journal of Soft Computing and Engineering (IJSCE), Jan. 2015, vol. 4, Issue 6.

eventhelix.com, "Location Update (GSM Location Update Procedure)," Jun. 12, 2014, https://www.eventhelix.com/RealtimeMantra/Telecom/GSM_Location_Update_Sequence_Diagram.pdf.

* cited by examiner

VISITOR LOCATION REGISTER REGISTRATION HANDLING

BACKGROUND

A denial-of-service (DoS) attack is an action taken by a rogue entity in order to temporarily or indefinitely disrupt or otherwise disable a service of a host connected to a network. A DoS attack may occur by taking advantage of bugs at a target network resource, and transmitting specific requests to exploit these vulnerabilities, or by inundating a targeted network resource with needless traffic to overload the network resource and prevent the fulfillment of authentic requests for service.

BRIEF DESCRIPTION OF THE DRAWINGS

Certain examples are described in the following detailed description and in reference to the drawings, in which.

DETAILED DESCRIPTION OF SPECIFIC EXAMPLES

The invention generally relates to a wireless communication network, and more particularly, to an improved Home Location Register (HLR) of a wireless communication network that is resistant to DoS attacks such as those described above. A Home Location Register (HLR) is a mobile network database of permanent subscriber data that handles location management procedures for mobile devices interacting with base stations across multiple regions. Wireless communications are provided through a wireless communication network, which can be realized, for example, as a Global System for Mobile Communications (GSM) network. The GSM network may include, for example, a Base Station Subsystem (BSS), a Network Switching System (NSS) and an Operations Support System (OSS).

Figure 1:
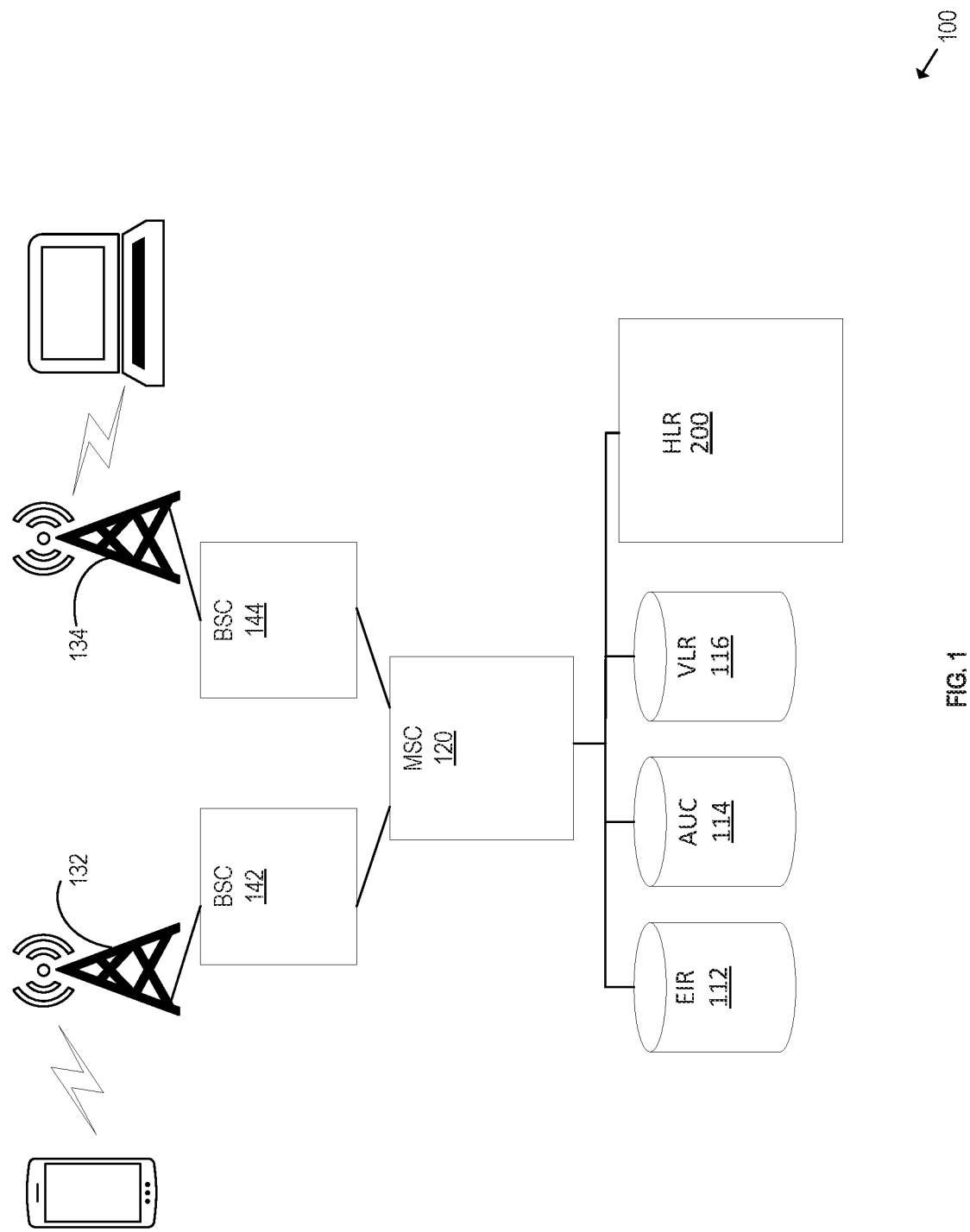
FIG. 1 is a block diagram of an example Global System for Mobile Communications (GSM) network that may incorporate Signaling System No 7 (SS7) protocols.

FIG. 1 is a block diagram 100 of an example GSM network that may incorporate Signaling System No 7 (SS7) protocols. FIG. 1 may include any number of Base Transceiver Stations (BTS), in this example 132, and 134 respectively; any number of base station controllers (BSC), in this example 142, and 144 respectively; and at least one mobile switching center (MSC) 120. HLR 200 of FIG. 1, may be a database of the core mobile network and may interact with a switch, such as MSC 120, for call control and processing. The core mobile network, by way of example, may further include other core network functions including, but not limited to, an Equipment Identity Register (EIR) 112, Authentication Center (AuC) 114, and Visitor Location Register (VLR) 116. HLR 200 may store static and transient subscriber profile information, including subscriber profile records. Subscriber profile records may include information about a subscriber for managing the network access of the subscriber, including but not limited to, an address, a current location, an account status, preferences, access privileges and policies, etc.

Where a subscriber enters a region covered by a Visitor Location Register (VLR), the VLR, e.g. VLR 116, may transmit a request to HLR 200 for information to process the call or other network request. VLR 116 may be a hardware resource in a cellular network, such as a server, or a combination of hardware and software that supports roaming functions for users outside the geographical boundaries of the HLR of the user. VLR 116 may obtain information about the user from HLR 200, e.g. by transmitting a MAP Update Location (UL) request to HLR 200. During operation, SS7 signals generally communicate between HLRs, VLRs, and other network entities over network links and through Signal Transfer Points (STPs), which are responsible for routing SS7 signals within a telecommunications network. For instance, MSC 120 may route the request of VLR 116 to HLR 200 for information, which is routed back to VLR 116. VLR 116 may thereby establish a temporary record for the user on VLR 116 while the user is roaming in the area covered by VLR 116.

Since the SS7 network does not traditionally have any authentication mechanism for network entities, rogue network entities may take advantage of the process described above to launch any number of Denial of Service (DoS) attacks. For example, a rogue network entity may issue a registration request for a subscriber. An HLR may treat the rogue entity as a genuine entity and process the registration request by first cancelling the subscriber's registration from their current location, and then registering the subscriber at the new location.

However, the HLR will fail to register the subscriber at the new location because the HLR will fail to update the requesting VLR. Specifically, the rogue entity may provide a fake address by design, which is not reachable by the HLR. Responsive to the failure of the HLR to register the subscriber, the HLR may stop the registration process and mark the subscriber as not registered, thereby disrupting the service of the subscriber.

Figure 2:
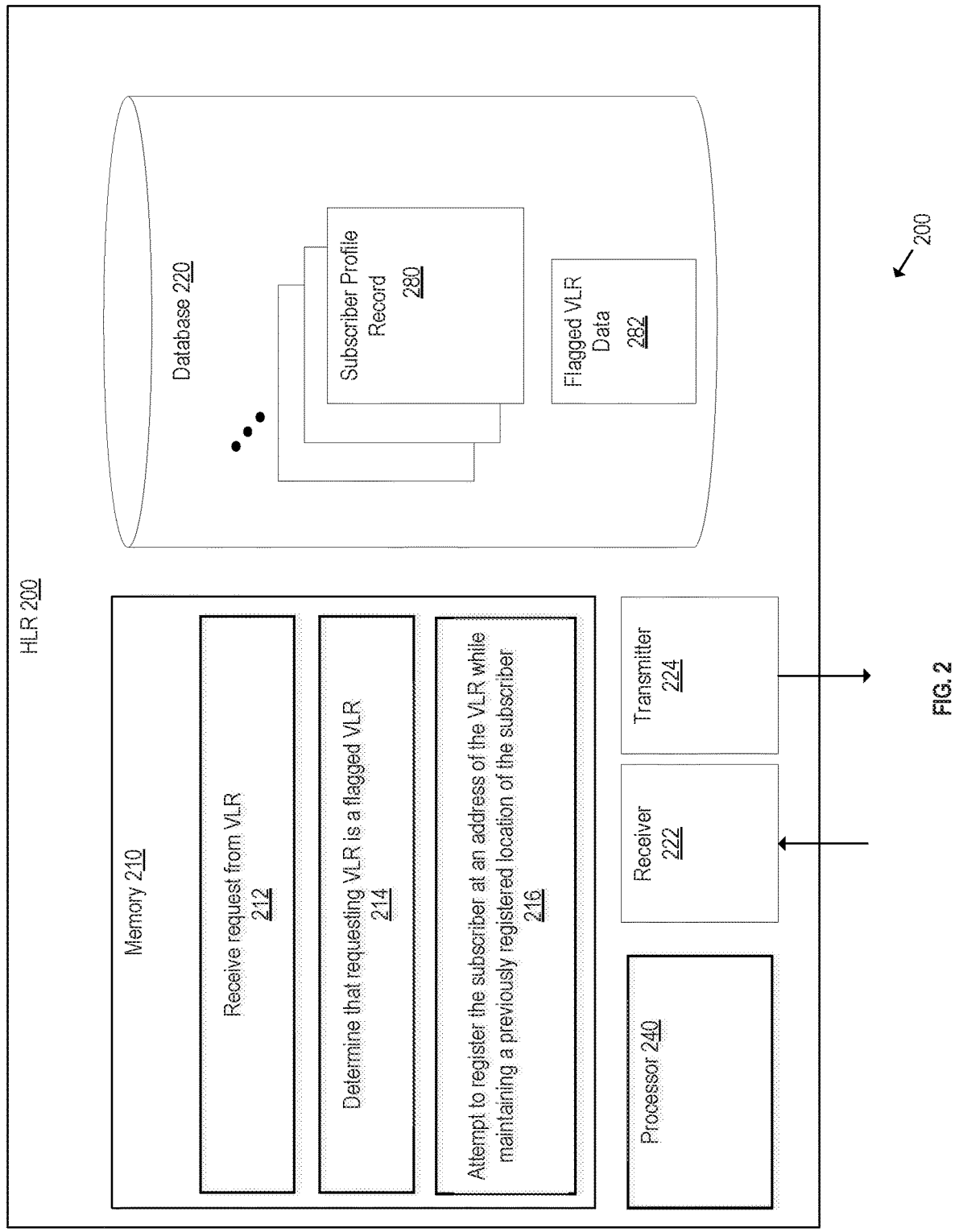
FIG. 2 is a block diagram of an example architecture of a Home Location Register (HLR) for registering a Visitor Location Register (VLR).

An HLR having capabilities to identify rogue entities and/or prevent disruption to the service of a subscriber is provided. FIG. 2 is a block diagram 200 of an example architecture for HLR 200 of FIG. 1. HLR 200 may include hardware, or a combination of hardware and software for managing subscriber profile records. Specifically, HLR 200 may include database 220 for storage of subscriber profile records as described above, as well as data associated with any flagged VLR 282. HLR may further include a receiver 222 and transmitter 224 for receiving and transmitting data respectively. HLR may also include memory 210 storing instructions 212-216 for updating a location of a subscriber at a subscriber profile record 280, and a processor 240 for executing instructions 212-216.

According to instructions 212, HLR 200 may receive a request from a VLR, e.g. VLR 116 of FIG. 1. Specifically, HLR 200 may receive a MAP Update Location (UL) request from VLR 116. Responsive to receiving the request and in accordance with instructions 214, HLR 200 may determine whether the requesting VLR is a flagged VLR with reference to flagged VLR data 282 as will be further described below. If the VLR is determined not to be a flagged VLR, HLR may update transient data within its internal data structure to reflect that the current serving VLR 116 is the VLR that sent the UL request. HLR 200 may further transmit a MAP Cancel Location (CL) request to the previous serving VLR (not shown) before completing the location update procedure, i.e. before initiating a MAP Insert Subscriber Data (ISD message) and registering the subscriber to the requesting VLR by downloading the subscriber profile record to the requesting VLR. The ISD message enables the HLR to download the applicable subscriber profile to the requesting VLR once the VLR is successfully registered. For a trusted VLR, updating the location of the subscriber prior to updating the requesting VLR may allow for more reliable service for the subscriber.

Where HLR 200 determines that the requesting VLR is a flagged VLR, HLR 200 may, in accordance with instructions 216, attempt to register the subscriber at the address of the requesting VLR while maintaining a previously registered location of the subscriber. In other words, HLR 200 may not update the location of the subscriber prior to successfully updating the requesting VLR. If the update to the requesting VLR is unsuccessful, e.g. due to an ISD "time out" waiting for a reply from the VLR due to an unreachable VLR address, HLR 200 may keep the subscriber registered at their current location. Additionally, a Gateway Mobile Switching Center (GMSC) of the GSM network, as is described in greater detail below, may transmit a message, e.g. a SRI/ATI message, to HLR 200 in order to route an incoming call to a subscriber. Where the message is received by HLR 200 while attempting to register the subscriber at the flagged VLR, HLR 200 may delay a transmission of a Provide Roaming Number (PRN) until completing the registration as is described in greater detail below. HLR 200 may further take corrective actions, including but not limited to: flagging the requesting VLR, blocking the requesting VLR, and/or notifying an operator that the requesting VLR is a potentially fraudulent VLR.

By maintaining the previously registered location of the subscriber until successful registration with the requesting VLR, and delaying any call routing until successful registration with the requesting VLR, disruption to the service of the subscriber may be avoided in the event the registration of the VLR is unsuccessful. Where registration of the VLR is unsuccessful, HLR 200 may instead deliver the call to the currently registered VLR and may block any invalid location change. Accordingly, disruption to a subscriber, e.g. due to a DoS attack, may be avoided.

Figure 3:
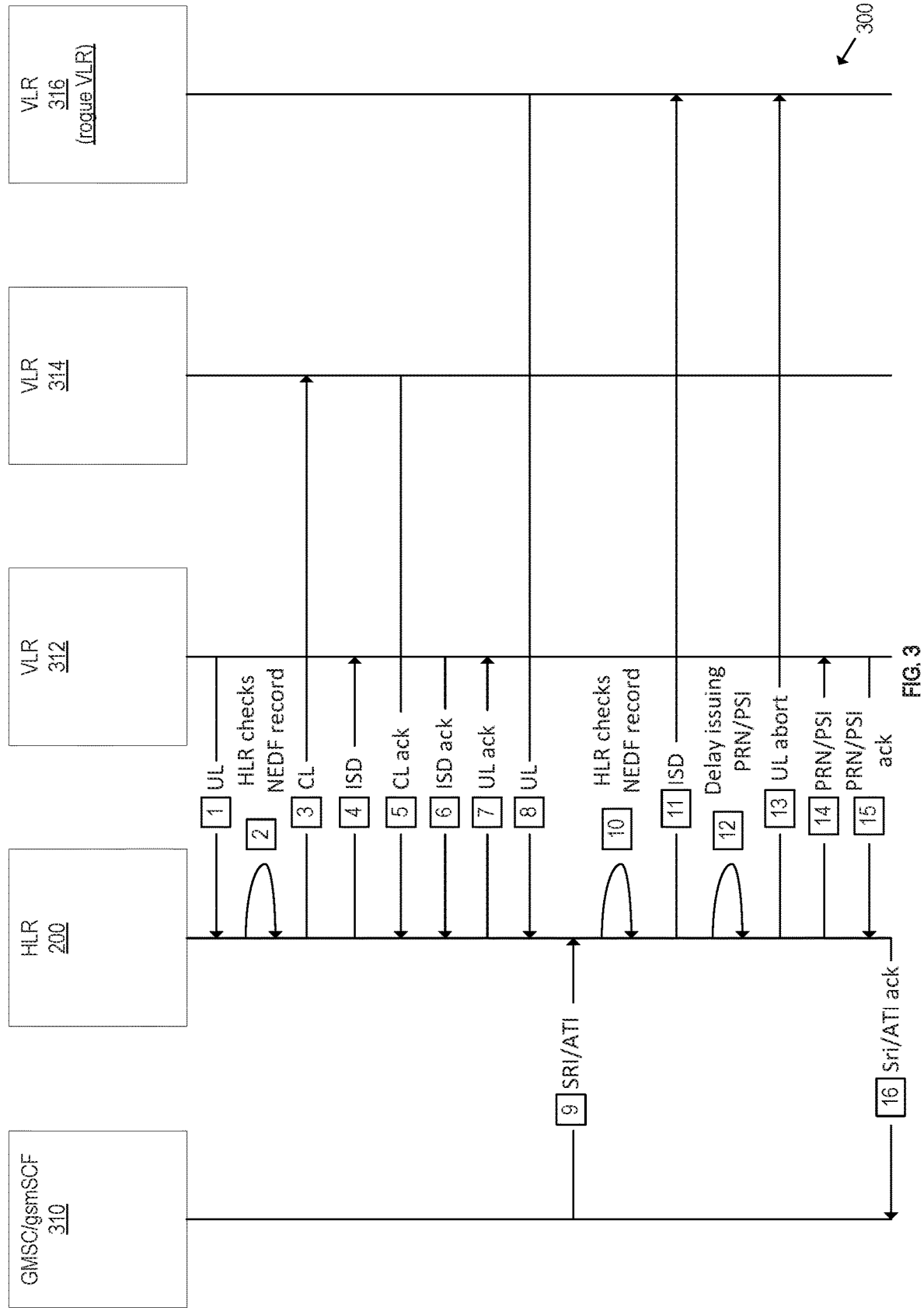
FIG. 3 is an example sequence diagram for updating a location record of a subscriber.

FIG. 3 is an example sequence diagram 300 for updating a location record of a subscriber such that disruption from DoS attacks are minimized. HLR 200 may include similar architecture to example HLR 200 illustrated at FIG. 1 and FIG. 2. HLR 200 may interface with Gateway Mobile Switching Center (GMSC)/GSM Service Control Function (gsmSCF) 310. GMSC may be an MSC as described above, specifically used to route calls outside the mobile network. The gsmSCF may be a functional entity including service logic, such as Customized Applications for Mobile network Enhanced Logic (CAMEL), to implement OSS and otherwise interface between the GMSC and HLR 200.

HLR 200 may further interface with any number of Visitor Location Registers (VLRs) to support roaming functions for users outside the geographical boundaries of HLR 200. For purposes of this example, VLR 312, VLR 314, and VLR 316 are illustrated, however HLR 200 may interface with any number of VLRs. VLR 312, VLR 314, and VLR 316 may be hardware resources in the cellular network, e.g. servers, that support roaming functions for users outside the geographical boundaries of HLR 200.

At 1, HLR 200 may receive an Update Location (UL) message from VLR 312. As described above, where a subscriber enters a region covered by a Visitor Location Register (VLR), the VLR may transmit a request to HLR 200 for information to process the call or other network request. VLR 312 may transmit the UL message to HLR 200 to obtain information for processing a call or other network request.

At 2, HLR 200 may check the flagged VLR data, e.g. flagged VLR data 282 to determine whether VLR 312 is a flagged VLR. Although flagged VLR data 282 is illustrated at database 220 in FIG. 2, the flagged VLR data, in some examples, may be accessed remotely by HLR 200. For example, HLR 200 may check a Network Entity Definition File (NEDF) at HLR 200 or accessible by HLR 200 over the network. The NEDF may contain data related to specific network entities that HLR 200 interacts with, including the requesting VLR 312.

At 3, HLR 200 may update the transient data, i.e. temporary data stored until the subscriber is registered with the requesting VLR, to indicate that the VLR currently serving the subscriber is VLR 312, and that the previous serving VLR is VLR 314. In other words, HLR 200 may update the transient data to reflect the location change of the subscriber. Where VLR 312 is not a flagged VLR as will be described in greater detail herein, HLR 200 may send a Cancel Location (CL) request to the previous serving VLR, in this case VLR 314. Once received, VLR 314 may remove the subscriber profile downloaded by HLR 200 during registration from its internal storage.

At 4, HLR 200 may attempt to register the subscriber at the requesting VLR by transmitting a profile of the subscriber to the requesting VLR, in this case VLR 312, e.g. via an Insert Subscriber Data (ISD) message. The information included in the profile of the subscriber may be used by VLR 312 to process a call or other network request by the subscriber.

At 5, HLR 200 may receive a CL acknowledgement from VLR 314. At 6, the HLR may receive an ISD message acknowledgement from VLR 312. At 7, HLR 200 may transmit an Update Location (UL) acknowledgement to the current service VLR, in this case VLR 312. Accordingly, HLR 200 may be updated to accurately reflect the location of the roaming subscriber, and VLR 312 may be updated with the information for processing the call or other network request by the roaming subscriber.

At 8, HLR 200 may receive an Update Location (UL) from VLR 316. VLR 316, may be, for example, a rogue VLR for conducting a Denial of Service (DoS) attack. At 9, HLR 200 may receive a Send Routing Information (SRI) or Anytime Interrogation (ATI) message from GMSC/gsmSCF 310 following receipt of the Update Location (UL) request at 8. The SRI message, for instance, may be used by GMSC/gsmSCF 310 to route an incoming call to the associated VLR so that the subscriber can receive the call. The ATI message may be used by gsmSCF 310 to obtain the subscriber's profile on demand.

At 10, an HLR Call Processing (CP) thread selects the Update Location (UL) first from a queue, e.g. at receiver 222 of FIG. 2, and processes it. HLR 200 may check the flagged VLR data 282/applicable default NEDF, and may indicate that instructions 216 of FIG. 2 are applicable. In this example, the check may be positive, indicating that VLR 316 is a flagged VLR, or in some examples, that VLR 316 belongs to a flagged geographic region. Responsive to this determination, HLR 200 may set a "Registration Pending with Screened VLR" attribute and otherwise delay issuing a Cancel Location (CL) request to the previous serving VLR, in this case VLR 312.

At 10, the process of registration at a new location begins. However, in some examples a subscriber may roam into a region of a flagged VLR and may receive an incoming call. In this example. GMSC/gsmSCF 310 may request from HLR 200, via an SRI message, the location of the subscriber such that GMSC/gsmSCF 310 may deliver the call to the subscriber. However, HLR 200 in this instance is in the process of registering the subscriber at flagged VLR 316. Where HLR 200 determines that VLR 316 is flagged, HLR 200 may delay the request to provide the subscriber's location information until a successful registration at the new location.

Specifically, at 11 HLR 200 may send an ISD message to VLR 316. At 12, another HLR CP thread picks the SRI/ATI from the queue and starts processing it. HLR 200 checks if a registration is in progress with VLR 316. Since the check yields a positive result, HLR 200 will delay sending a Provide Roaming Number/Provide Subscriber Info (PRN/PSI) to the current serving VLR as per the "PRC SRI/ATI Timer" value.

HLR 200 may "time out." For instance, the "PRC SRI/ATI Timer" value may surpass a predetermined threshold. Where a predetermined time passes from sending the ISD message at 11 without receiving a corresponding ISD acknowledgement back from the receiving VLR, a "time out" may occur. Responsive to the "time out," HLR 200 may retry the ISD according to a "PRO ISD Retries Count" attribute. In other words, HLR 200 may retry transmitting the ISD a predetermined number of times. In an example, the predetermined number of times may be determined based on a status of the VLR, e.g. whether the VLR is a flagged VLR, or any other attributes associated with the VLR, e.g. geographical region, previous attempts to access the VLR, etc.

At 13, once attempts to retry transmitting the ISD to VLR 316 have been exhausted, HLR 200 may abort the UL request. In this instance, registration of VLR 316 may be considered "unsuccessful." Responsive to the registration failure, HLR 200 may log a suppressible error event. The error event may contain, for example, the IMSI and/or any other information associated with VLR 316. In some example implementations, HLR 200 may track how many times UL requests from VLR 316 have been aborted, and/or how many times UL requests from VLRs associated with a specific attribute have been aborted, such as VLRs from a geographical region. In some example implementations, HLR 200 may flag VLR 316 where HLR 200 surpasses a threshold number of times UL requests from VLR 316 have been aborted.

At 12 as described above, HLR 200 delays, for a predetermined time, sending a PSN/PSI to the registered VLR in response to a receive SRI/ATI message at 9. At 14, when the timer expires, HLR 200 sends the PRN/PSI, i.e. a message used by HLR 200 to receive routing and location information of a subscriber, to the current serving VLR, in this case VLR 312. At 15, HLR 200 may receive a PRN/PSI acknowledgement from VLR 312, whereby at 16 HLR 200 may transmit a SRI/ATI acknowledgement to GMSC/gsmSCF 310.

Figure 4:
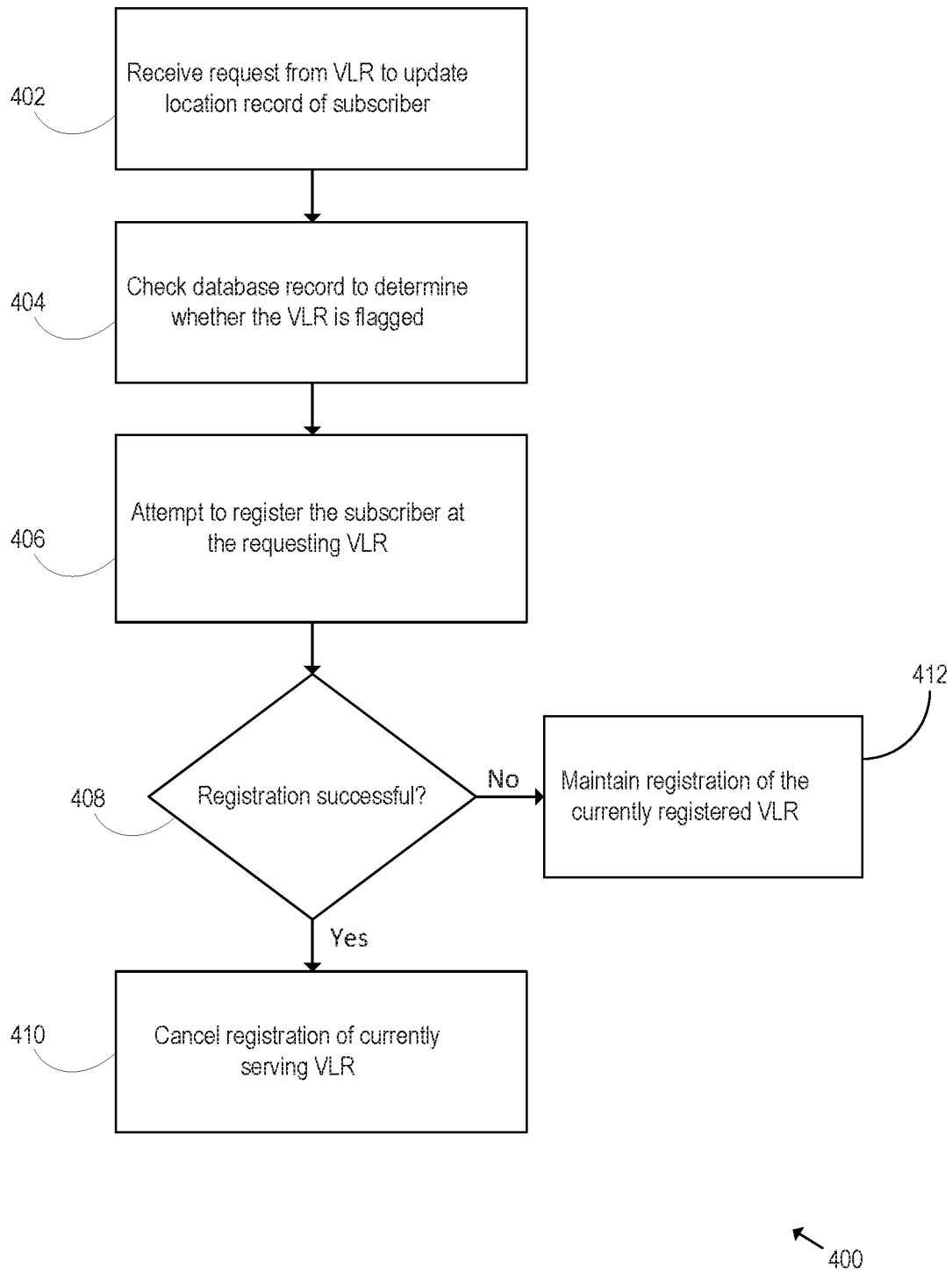
FIG. 4 is an example flowchart illustrating a method for registering a VLR.
Figure 5:
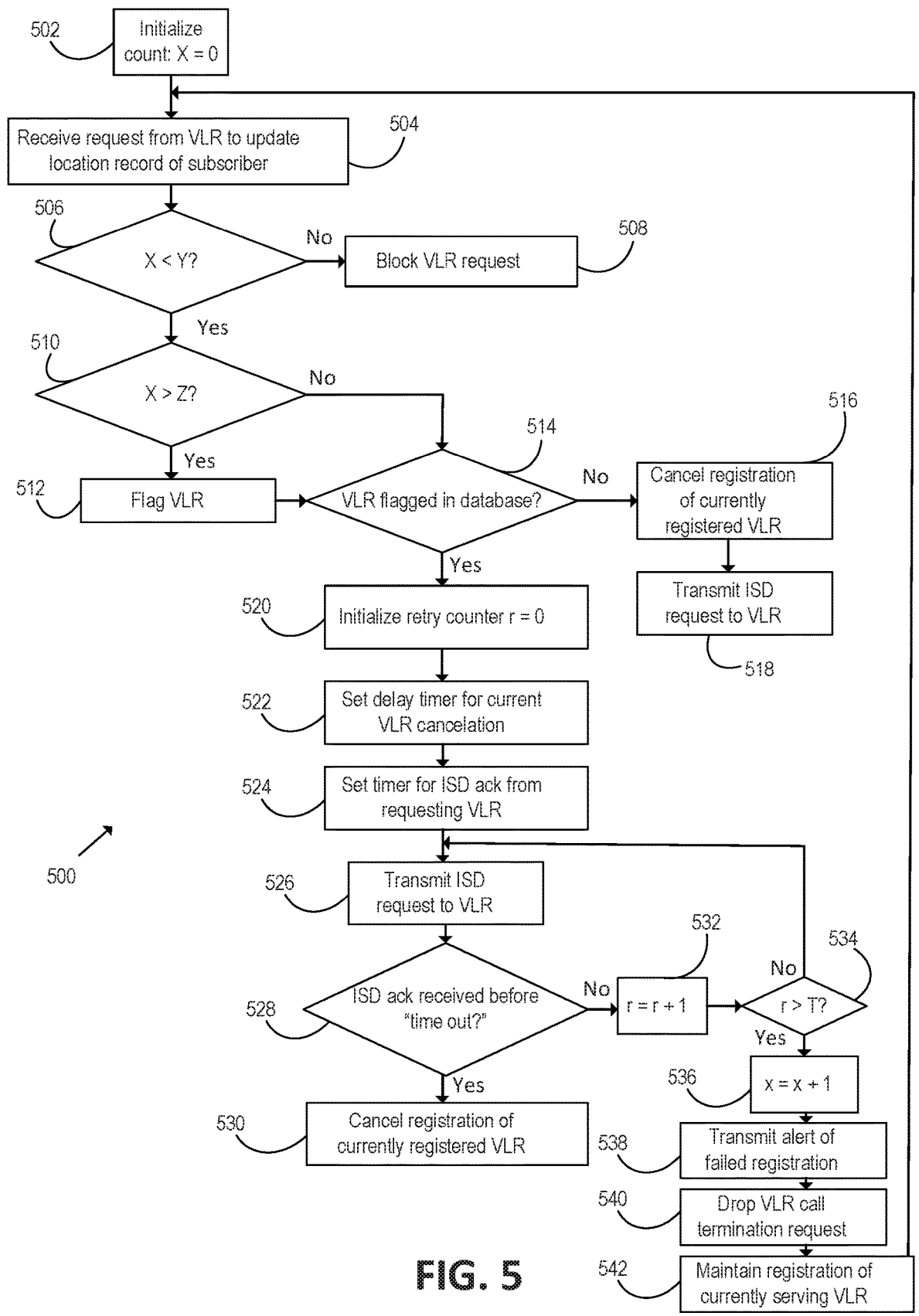
FIG. 5 is an example flowchart illustrating another method for registering a VLR.
Figure 6:
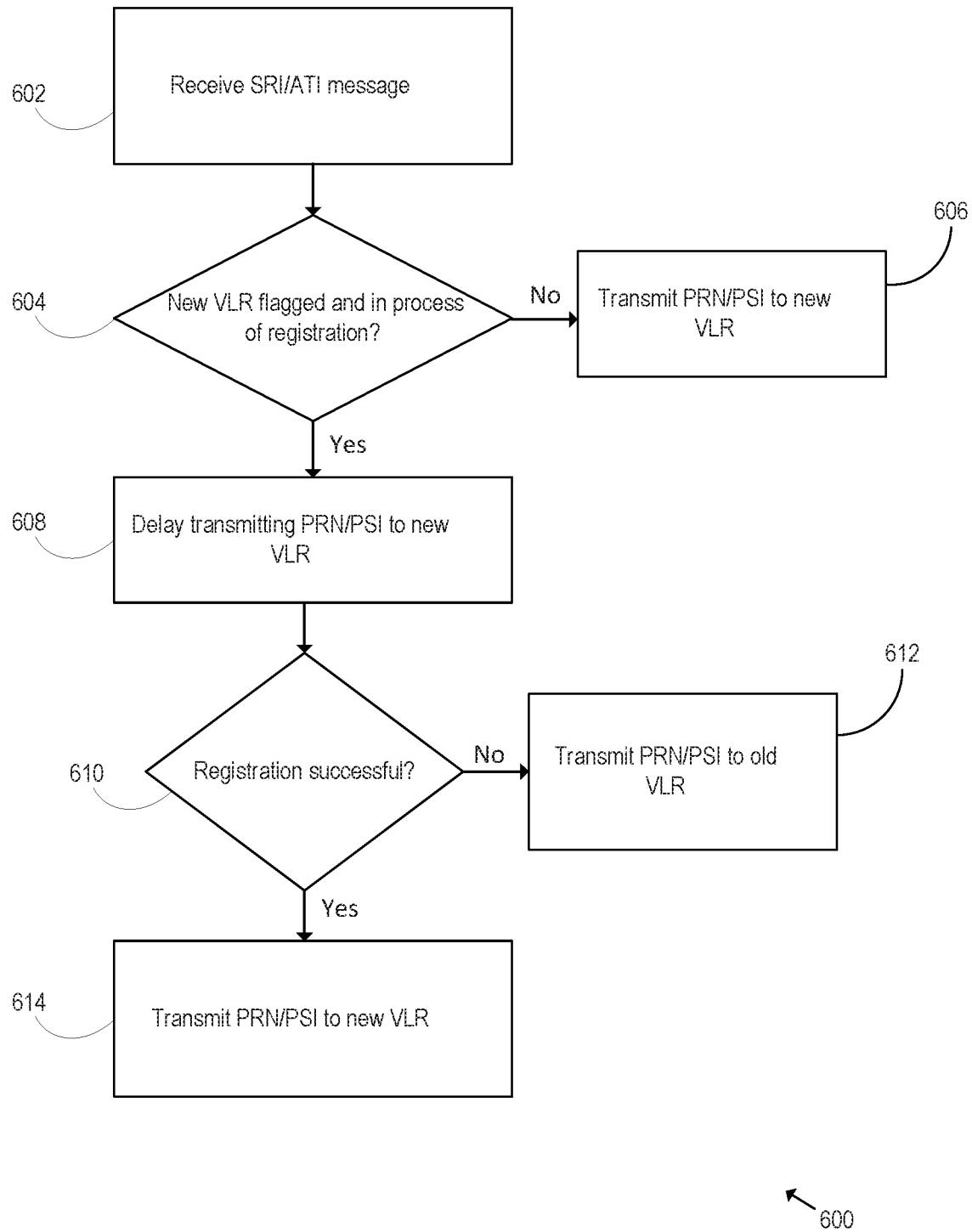
FIG. 6 is an example flowchart illustrating a method for transmitting a Provide Roaming Number (PRN) to a VLR.

FIGS. 4-6 are flowcharts, 400-600 respectively, illustrating a method for registering a VLR such that DoS attacks are minimized. Although execution of method 400, method 500, and method 600 are described below with reference to HLR 200 of FIG. 2, this is for explanatory purposes and other suitable components for execution of method 400, method 500, and method 600 may be utilized. Methods 400-600 may be implemented in the form of executable instructions stored on a machine-readable storage medium and/or in the form of electronic circuitry, e.g. hardware. In some examples, steps of method 400, method 500, and method 600 may be executed substantially concurrently or in a different order than shown in FIG. 4 and FIG. 5. In some examples, methods 400-600 may include more or less steps than are shown in FIG. 4, FIG. 5, and FIG. 6. In some examples, some of the steps of method 400-600 may, at certain times, be ongoing and/or may repeat.

At block 402, a request may be received, e.g. by HLR 200 of FIG. 2, from a VLR to update a location record of a subscriber. Specifically, HLR 200 may receive a MAP Update Location (UL) request from VLR 116. Where a subscriber enters a region covered by a Visitor Location Register (VLR), the VLR may transmit a request to HLR 200 for information to process the call or other network request. The VLR may obtain information about the user from HLR 200, e.g. by transmitting a MAP Update Location (UL) request to HLR 200.

At block 404, a database record may be checked to determine whether the VLR from which the request was received is a flagged VLR. For example, HLR 200 may check the requesting VLR against flagged VLR data 282. A determination that the requesting VLR is flagged may carry out an alternative procedure in which, for example, the transmission of a Cancel Location (CL) request from HLR 200 is delayed.

At block 406, HLR 200 may attempt to register the subscriber at the requesting VLR. HLR 200 may attempt to register the subscriber at the requesting VLR by transmitting a profile of the subscriber to the requesting VLR, e.g. via an Insert Subscriber Data (ISD) message. The information included in the profile of the subscriber may be used by the VLR to process a call or other network request by the subscriber.

At block 408, it may be determined whether registration of the requesting VLR was successful. For instance, HLR may receive an ISD message acknowledgement from the requesting VLR prior to a "time out" timer at HLR 200 expiring. At block 410, responsive to a successful registration, the registration of a currently serving VLR, i.e. the VLR serving prior to receiving the request at block 402, may be canceled. HLR 200 may further update the subscriber profile record of the subscriber, stored for example, at database 220, to reflect the new location of the subscriber.

At block 412, responsive to a failure to register the requesting VLR, the registration of the currently registered VLR may be maintained. In some examples, the requesting VLR may be flagged and/or blocked responsive to a failure to register the requesting VLR. In some example implementations, HLR 200 may generate an alert, either directly or indirectly, to inform an operator or other interested party of the registration failure. In some example implementations, HLR 200 may increase a suspicion counter to track how many attempts to register the requesting VLR were tried.

For example, turning to FIG. 5, suspicion counter X may be initiated at block 502 to track failed attempts to register a VLR. At block 504, a request may be received from a VLR, e.g. by HLR 200 of FIG. 2, to update a location record of a subscriber. At block 506, it may be determined whether the counter is less than a threshold Y. Where X is not less than the threshold Y, indicating that a threshold number of failed registration attempts has been reached, HLR 200 may block the requesting VLR, and may otherwise drop the request. Specifically, HLR 200 may turn on a "Deny Service"

attribute indicating that HLR 200 is to abort any Update Location (UL) request from the "rogue" VLR. In some example implementations, HLR 200 may log a suppressible error event. Specifically, the event may be logged at a reporting system for monitoring, e.g. by an operator, of the health, network information, subscriber information, etc. of the network components.

Where counter X is determined to be less than Y, it may be determined at block 510 whether X is greater than a threshold Z. In some examples, threshold Z may be less than threshold Y. Where threshold X is determined to be greater than threshold Z, the requesting VLR may be flagged at block 512. For example, the requesting VLR may be added to a list of "flagged" VLRs 282 and may be recorded at database 220 of HLR 200, e.g. at a Network Entity Definition File (NEDF) database. In other examples, the list of flagged VLRs may be recorded and stored remotely.

At block 514, it may be determined whether the requesting VLR is flagged. For instance, HLR 200 may check flagged VLR data record 282 of database 220 to determine whether a requesting VLR has been flagged. The VLR may have been flagged at block 512, or may have otherwise been flagged by any number of other means. For instance, VLR may have been flagged manually by an operator. In other examples, VLR may have an address within a geographical region, e.g. country, city, local network area, or other cell tracking area that may be flagged such that any VLR sharing the address may be considered a flagged VLR. In some examples, a particular country code, area code, or more specific region may be flagged such that any VLR sharing that attribute may be flagged. In other examples, other VLR attributes may be flagged such that any VLR sharing that attribute may be considered a flagged VLR.

Responsive to a determination that the requesting VLR is not flagged, HLR 200 may carry out a corresponding procedure for handling a "genuine" or "non-suspicious" requesting VLR. For example, at block 516, the registration of the currently serving VLR may be canceled. Specifically, HLR 200 may process the registration request by cancelling the subscriber's registration from their current location, and then registering the subscriber at the new location at block 518, by transmitting an Insert Subscriber Data (ISD) request to the requesting VLR.

Where it is determined at block 514 that the VLR is a flagged VLR, a different procedure for handling a "suspicious" VLR may be executed. In some example implementations, a determination at the VLR is flagged may enable a Post Registration Cancelation feature of HLR 200, whereby the process described at blocks 520-542 is executed.

At block 520, a retry counter r may be initialized. The retry counter may track how many times HLR 200 attempts to register the subscriber at the requesting VLR. Furthermore, a delay timer for cancelation of the current serving VLR may be initiated at block 522. The delay timer may maintain the registration of the currently registered VLR until a successful or failed registration of the subscriber at the requesting VLR. The delay timer may be set to a predetermined time that is long enough to allow for successful or failed registration of the subscriber at the requesting VLR.

At block 524, a timer may be initiated for receiving an acknowledgement from the requesting VLR, whereupon a "time out" may occur upon expiration of the timer. At block 526, HLR 200 may transmit an ISD request to the requesting VLR.

At block 528, it may be determined whether an ISD acknowledgement was received by the requesting VLR prior to expiration of the timer set at block 524. At block 530, responsive to a positive determination, and thereby a successful registration of the requesting VLR, the registration of the currently registered, i.e. previously serving, VLR may be canceled.

At block 532, where an ISD acknowledgement is not received before the "time out," the retry counter initialized at block 520 may be incremented. It may be determined at block 534 whether the retry counter is greater than a threshold T number of tries. A negative determination at block 534 leads to a return to block 526, where an ISD request may be retransmitted to the requesting VLR. Where the number of retries r is determined to be greater than the threshold T, the registration of the requesting VLR is considered to have failed, and the suspicion counter may be incremented at block 536.

At block 538, an alert may be generated responsive to the failure to register the subscriber at the requesting VLR. Specifically, the HLR may transmit an alert to an operator indicating the failed registration such that the operator may take remedial action. Furthermore, at block 540, HLR 200 may drop any request to terminate a subscriber call as described above.

At block 542, the registration of the currently serving VLR may be maintained. In other words, the location of the subscriber according to the subscriber record registered at the HLR is maintained, along with any currently serving VLR. In an example, the registration may be maintained until such time that it is canceled by a later VLR request at blocks 516 or blocks 530.

Accordingly, the level of suspicion of any given VLR may be tracked, such that no rogue DOS attack from a VLR registration request may continually disrupt the registration of a subscriber. Where a suspicion level of a VLR reaches a threshold level Z, the VLR may be flagged and a more cautious procedure is executed whereby the registration of a currently serving VLR is maintained until successful registration of a requesting VLR. In some example implementations, where a suspicion level of a VLR reaches a higher threshold level Y, the requesting VLR may be blocked entirely. As described herein, VLRs may also be manually flagged or blocked as well, depending on various criteria associated with a group of VLRs.

FIG. 6 is a flow chart 600 illustrating a method for delivering a Provide Roaming Number (PRN) to a Visitor Location Register (VLR). At block 602, a Send Routing Information (SRI) or Anytime Interrogation (ATI) message may be received, e.g. from GMSC/gsmSCF 310 to HLR 200. The SRI message, for instance, may be used by GMSC/gsmSCF 310 to route an incoming call to a subscriber to the associated VLR so that the subscriber can receive the call.

At block 604, HLR 200 may check if a registration is in progress with VLR 316. HLR 200 may further determine whether VLR 316 is in the process of registration. Where VLR 316 is not in the process of registration or is not a flagged VLR, HLR 200, at block 606, may send a Provide Roaming Number/Provide Subscriber Info (PRN/PSI) to VLR 316. VLR 316 may thereby provide the roaming number to HLR 200 which HLR 200 may pass back to the GMSC. GMSC may use the received roaming number to deliver the call to the VLR.

At block 608, where the check yields a positive result, HLR 200 will delay, for a predetermined time, sending a Provide Roaming Number/Provide Subscriber Info (PRN/PSI) to the current serving VLR. The predetermined time may be long enough to complete a successful or failed registration of VLR 316. It may be determined at block 610 whether registration of VLR 316 was successful. Responsive to a failed registration, at block 612, HLR 200 may send the PRN/PSI, i.e. a message used by HLR 200 to receive routing and location information of a subscriber, to the current serving VLR, e.g. VLR 312. If the registration is successful however, at block 614, HLR 200 may send the PRN/PSI to successfully subscribed VLR 316.

Figure 7:
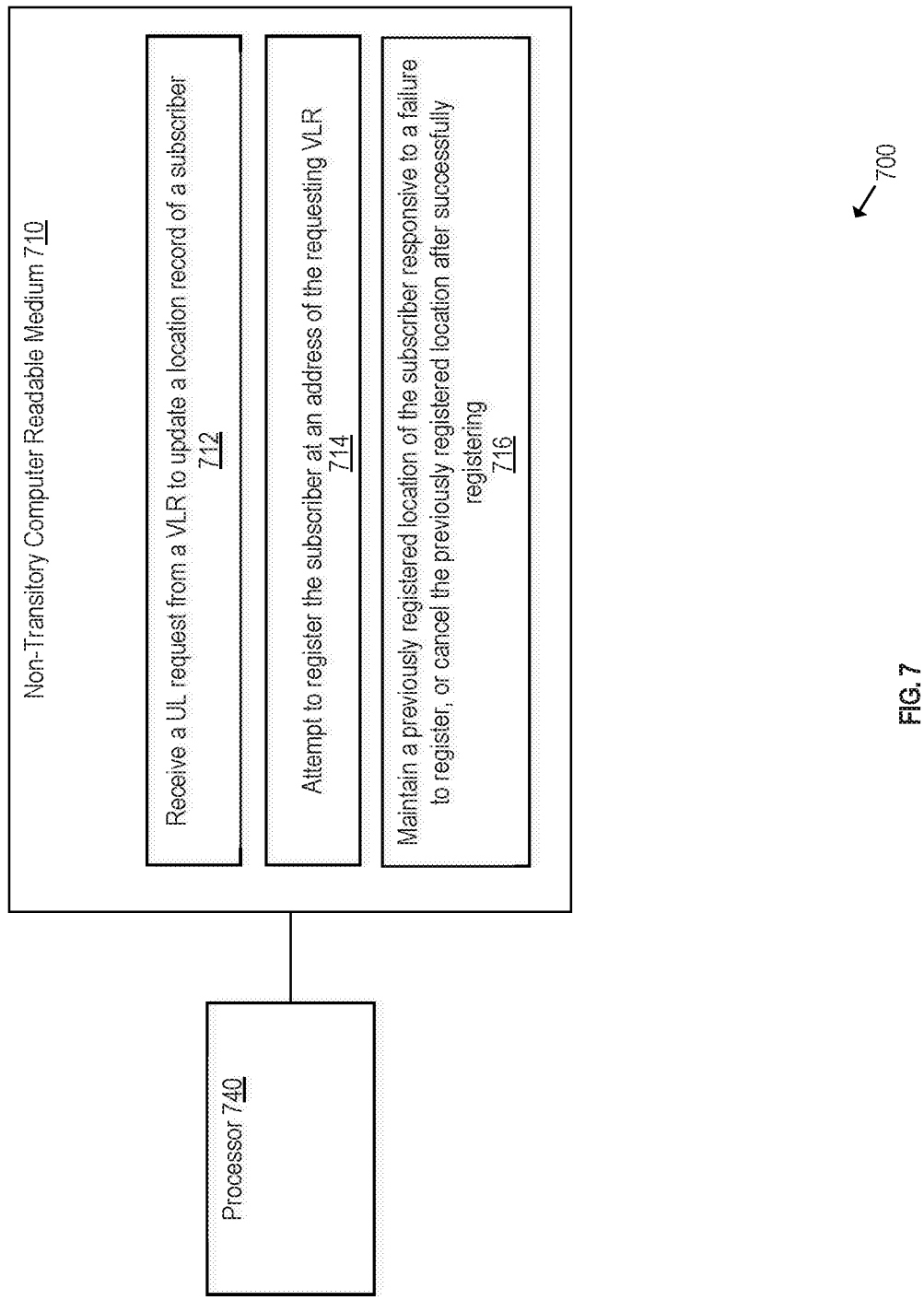
FIG. 7 is an example block diagram illustrating an example non-transitory computer readable medium for registering a requesting VLR.

FIG. 7 is an example block diagram 700 illustrating a non-transitory computer readable medium 710 including processor executable instructions 712-716 for registering a requesting VLR. Non-transitory computer readable medium 710 may be implemented in a single device or distributed across devices. Likewise, processor 740 may represent any number of physical processors capable of executing instructions stored by computer readable medium 710.

As used herein, a "computer readable medium" may be any electronic, magnetic, optical, or other physical storage apparatus to contain or store information such as executable instructions, data, and the like. For example, any computer readable medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer readable medium described herein may be non-transitory. In examples described herein, a computer readable medium or media may be part of an article (or article of manufacture). An article or article of manufacture may refer to any manufactured single component or multiple components.

Processor 740 may be a central processing unit (CPU), graphics processing unit (GPU), microprocessor, and/or other hardware device suitable for retrieval and execution of instructions stored in computer readable medium 710. Processor 740 may fetch, decode, and execute program instructions 712-716, and/or other instructions. Similarly, processor 740 may fetch, decode, and execute program instructions 712-716. As an alternative or in addition to retrieving and executing instructions, processor 740 may include at least one electronic circuit comprising a number of electronic components for performing the functionality of instructions 712-716, and/or other instructions. Similarly, processor 740 may include at least one electronic circuit comprising a number of electronic components for performing the functionality of instructions 712-716, and/or other instructions.

Computer readable medium 710 may include instructions 712-716, the instructions executable by processor 740. Computer readable medium 710, may, for example, include instructions 712 to receive a request e.g. by HLR 200 of FIG. 2, from a VLR to update a location record of a subscriber. Specifically, the HLR may receive a MAP Update Location (UL) request from the requesting VLR. Where a subscriber enters a region covered by a Visitor Location Register (VLR), the VLR may transmit a request to the HLR for information to process the call or other network request. The VLR may obtain information about the user from the HLR, e.g. by transmitting a MAP Update Location (UL) request to the HLR.

Computer readable medium 710 may include instructions 714 for attempting to register the subscriber at the requesting VLR. For example, the HLR may attempt to register the subscriber at the requesting VLR by transmitting a profile of the subscriber to the requesting VLR, e.g. via an Insert Subscriber Data (ISD) message. The information included in the profile of the subscriber may be used by the VLR to process a call or other network request by the subscriber.

Computer readable medium 710 may include instructions 716 to cancel the previously registered location of the subscriber responsive to receiving an acknowledgement from the requesting VLR that the registration was successful. The subscriber profile record of the subscriber, stored for example, at database 220 of HLR 200, may be updated to reflect the new location of the subscriber. However, responsive to a failure to register the requesting VLR, the registration of the currently registered VLR may be maintained. Computer readable medium 710 may further include instructions 616 for maintaining a previously registered location of the subscriber responsive to a failure to register the requesting VLR. In some examples, instructions 616 are carried out where a "Post Registration Cancelation" feature is enable at the HLR as described above.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A system comprising:
   a database storing at least one record of a subscriber profile for a mobile network, the subscriber profile including a location of a subscriber associated with the subscriber profile;
   a processor; and
   a memory including instructions that, when executed by the processor, causes the processor to:
   receive an Update Location (UL) request from a Visitor Location Register (VLR) to update the location of the subscriber at the subscriber profile;
   determine that the requesting VLR is a flagged VLR;
   responsive to determining that the requesting VLR is flagged:
   attempt to register the subscriber at an address of the VLR; and
   responsive of a failure to register the subscriber, maintaining a previously registered location of the subscriber at the database.

2. The system of claim 1, wherein attempting to register the subscriber at the address of the VLR includes transmitting the profile of the subscriber to the requesting VLR.

3. The system of claim 2, where the memory further comprises instructions for determining the failure to register the subscriber, the failure determined upon surpassing a threshold wait time for a reply from the requesting VLR upon transmitting the subscriber profile to the requesting VLR.

4. The system of claim 1, wherein determining that the requesting VLR is flagged includes comparing the requesting VLR against a list of VLRs.

5. The system of claim 1, wherein determining that the requesting VLR is flagged includes comparing an address of the requesting VLR against a list of predetermined addresses.

6. The system of claim 1, wherein the memory further comprises instructions for increasing a count attributed to the requesting VLR responsive to the failure to register the subscriber, and wherein the requesting VLR is flagged responsive to the count surpassing a threshold.

7. The system of claim 1, wherein the memory further comprises instructions for transmitting an alert of the failed subscriber registration to an operator.

8. The system of claim 1, further comprising, upon receiving a message to route an incoming call to a subscriber while attempting to register the subscriber at the requesting VLR, delaying a transmission of a Provide Roaming Number (PRN) until completing the registration.

9. The system of claim 1, wherein the system is a Home Location Register (HLR).

10. The system of claim 1, further wherein the memory further comprises instructions to:
 retry attempting to register the subscriber at the requesting VLR a predetermined number of times; and
 responsive to a failure to register the subscriber at the requesting VLR the predetermined number of times, aborting the UL request and maintaining the previously registered location of the subscriber at the database.

11. A non-transitory computer readable medium comprising instructions that, when executed by a processor, causes the processor to:
 receive an Update Location (UL) request from a Visitor Location Register (VLR) to update a location record of a subscriber associated with a subscriber profile stored at a database;
 where a "Post Registration Cancelation" feature is enabled, delaying a cancelation of a currently registered VLR, the delay including:
  attempting to register the subscriber at an address of the requesting VLR; and
  maintaining a previously registered location of the subscriber at the database responsive to a failure to register the subscriber.

12. The non-transitory computer readable medium of claim 11, wherein the "Post Registration Cancelation" feature is enabled upon determining that the requesting VLR is a flagged VLR.

13. The non-transitory computer readable medium of claim 12, further comprising instructions for increasing a count attributed to the requesting VLR responsive to the failure to register the subscriber, and wherein the requesting VLR is flagged responsive to the count surpassing a threshold.

14. The non-transitory computer readable medium of claim 13, wherein attempting to register the subscriber at the address of the VLR includes transmitting the profile of the subscriber to the requesting VLR.

15. The non-transitory computer readable medium of claim 14, further comprising instructions for determining the failure to register the subscriber, the failure determined upon surpassing a threshold wait time for a reply from the requesting VLR upon transmitting the subscriber profile to the requesting VLR.

16. A method comprising:
 receiving an request from a Visitor Location Register (VLR) to update a location record of a subscriber associated with a subscriber profile stored at a database;
 checking a record of the database to determine whether the VLR is a flagged VLR;
 responsive to determining that the VLR is flagged, delaying a cancelation of a currently registered VLR, the delay including:
  attempting to register the subscriber at the requesting VLR; and
  maintaining the registration of the currently registered VLR after failing to register the subscriber, or canceling a registration of the currently registered VLR after successfully registering the subscriber.

17. The method of claim 16, wherein determining that the requesting VLR is flagged includes comparing the requesting VLR against a list of VLRs stored at the database.

18. The method of claim 16, wherein determining that the requesting VLR is flagged includes determining whether the VLR originates from an address of a list of flagged addresses.

19. The method of claim 16, further comprising increasing a count attributed to the requesting VLR responsive to the failure to register the subscriber, and wherein the requesting VLR is flagged responsive to the count surpassing a first count threshold.

20. The method of claim 19, wherein the memory further comprises instructions for blocking the requesting VLR responsive to the count attributed to the requesting VLR surpassing a second count threshold greater than the first count threshold.

* * * * *